US012148415B2

(12) United States Patent
Zhang et al.

(10) Patent No.: US 12,148,415 B2
(45) Date of Patent: Nov. 19, 2024

(54) SYSTEMS AND METHODS FOR SYNTHESIZING SPEECH

(71) Applicant: ZHEJIANG TONGHUASHUN INTELLIGENT TECHNOLOGY CO., LTD., Zhejiang (CN)

(72) Inventors: Peng Zhang, Hangzhou (CN); Xinhui Hu, Hangzhou (CN); Xinkang Xu, Hangzhou (CN); Jian Lu, Hangzhou (CN)

(73) Assignee: ZHEJIANG TONGHUASHUN INTELLIGENT TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 18/465,143

(22) Filed: Sep. 11, 2023

(65) Prior Publication Data

US 2023/0419948 A1 Dec. 28, 2023

Related U.S. Application Data

(63) Continuation of application No. 17/445,385, filed on Aug. 18, 2021, now Pat. No. 11,798,527.

(30) Foreign Application Priority Data

Aug. 19, 2020 (CN) ......................... 202010835266.3
Oct. 23, 2020 (CN) ......................... 202011148521.3

(51) Int. Cl.
*G10L 13/00* (2006.01)
*G10L 13/047* (2013.01)
*G10L 15/00* (2013.01)

(52) U.S. Cl.
CPC .................................. *G10L 13/047* (2013.01)

(58) Field of Classification Search
CPC ................................ G10L 13/00; G10L 15/00
See application file for complete search history.

(56) References Cited

U.S. PATENT DOCUMENTS 9,401,140 B1 7/2016 Weber et al.
10,468,014 B1 11/2019 Edwards et al.
10,706,837 B1 7/2020 Chicote et al.
(Continued)

FOREIGN PATENT DOCUMENTS

CN 1731509 A 2/2006
CN 101271687 A 9/2008
(Continued)

OTHER PUBLICATIONS

First Office Action in Chinese Application No. 202011148521.3 mailed on Jul. 1, 2022, 19 pages.
(Continued)

*Primary Examiner* — Shreyans A Patel
(74) *Attorney, Agent, or Firm* — METIS IP LLC

(57) ABSTRACT

The present disclosure discloses a method for synthesizing a speech. The method includes generating the speech based on a text with a speech synthesis model, wherein the speech synthesis model includes an embedding layer, a speech synthesis layer, and a position layer; and training the speech synthesis model when an evaluation index meets a preset condition, wherein the evaluation index includes one or more quality indexes determined based on at least a part of the text and at least a part of the speech.

20 Claims, 7 Drawing Sheets

100

(56) References Cited

U.S. PATENT DOCUMENTS

| | | | | |
|---|---|---|---|---|
| 10,854,192 | B1 * | 12/2020 | Maas | G10L 15/26 |
| 11,798,527 | B2 * | 10/2023 | Zhang | G10L 13/02 |
| 2002/0198712 | A1 | 12/2002 | Hinde et al. | |
| 2007/0129948 | A1 | 6/2007 | Yi et al. | |
| 2011/0282650 | A1 | 11/2011 | Jennings et al. | |
| 2015/0046164 | A1 | 2/2015 | Maganti | |
| 2018/0174570 | A1 | 6/2018 | Tamura et al. | |
| 2018/0247636 | A1 | 8/2018 | Arik et al. | |
| 2019/0371292 | A1 | 12/2019 | Gu et al. | |
| 2020/0243066 | A1 | 7/2020 | Je et al. | |
| 2020/0372897 | A1 * | 11/2020 | Battenberg | G06N 3/045 |
| 2021/0065712 | A1 * | 3/2021 | Holm | G10L 15/02 |
| 2021/0210112 | A1 | 7/2021 | Zheng et al. | |
| 2022/0059072 | A1 * | 2/2022 | Zhang | G10L 13/02 |
| 2023/0036020 | A1 | 2/2023 | Flynn et al. | |
| 2023/0206902 | A1 | 6/2023 | Guo et al. | |

FOREIGN PATENT DOCUMENTS

| | | | | | |
|---|---|---|---|---|---|
| CN | 107564511 | A | | 1/2018 | |
| CN | 107657947 | A | | 2/2018 | |
| CN | 107810529 | A | * | 3/2018 | G10L 15/18 |
| CN | 109767752 | A | | 5/2019 | |
| CN | 110136691 | A | | 8/2019 | |
| CN | 110288973 | A | | 9/2019 | |
| CN | 110853616 | A | | 2/2020 | |
| CN | 111326136 | A | | 6/2020 | |
| CN | 111899716 | A | * | 11/2020 | |
| CN | 110473525 | B | * | 4/2022 | G10L 15/063 |
| EP | 3308378 | B1 | | 9/2019 | |
| JP | S6345950 | A | | 2/1988 | |
| JP | H1145099 | A | | 2/1999 | |
| JP | 2017083621 | A | | 5/2017 | |
| JP | 2019124940 | A | | 7/2019 | |

OTHER PUBLICATIONS

Lei, Ming, Research on Acoustic Modeling Methods in Statistical Parametric Speech Synthesis, Doctor's Theses of University of Science and Technology of China, 2012, 130 pages.

Liu, Rui et al., Teacher-Student Training for Robust Tacotron-Rased TTS, 2020 IEEE International Conference On Acoustics, Speech And Signal Processing, 6274-6278, 2020.

* cited by examiner

SYSTEMS AND METHODS FOR SYNTHESIZING SPEECH

CROSS-REFERENCE TO RELATED APPLICATIONS

The present application is a continuation of U.S. patent application Ser. No. 17/445,385, filed on Aug. 18, 2021, which claims priority to Chinese Application No. 202010835266.3 filed on Aug. 19, 2020 and Chinese Application No. 202011148521.3 filed on Oct. 23, 2020, the entire contents of each of which are hereby incorporated by reference.

TECHNICAL FIELD

The present disclosure relates to a speech synthesis field, and in particular, to systems and methods for synthesizing a speech.

BACKGROUND

Recently, speech synthesis technologies have developed. Speech synthesis model is a neural network model that can convert text into corresponding speech, and the evaluation of the speech synthesis model is still generally based on manual evaluation, which is difficult to meet the needs of some scenarios with automation requirements. Moreover, when the text is processed with the speech synthesis model, the text may be processed incorrectly and resulting in subsequent speech errors.

Therefore, it is necessary to propose a method for synthesizing a speech to convert text into corresponding speech automatically, thereby improving the synthesis efficiency and ensuring the accuracy.

SUMMARY

According to some embodiments of the present disclosure, a method for synthesizing a speech is provided. The method includes: generating the speech based on a text with a speech synthesis model, wherein the speech synthesis model includes an embedding layer, a speech synthesis layer, and a position layer; and training the speech synthesis model when an evaluation index meets a preset condition, wherein the evaluation index includes one or more quality indexes determined based on at least a part of the text and at least a part of the speech.

According to some embodiments of the present disclosure, a system for synthesizing a speech is provided. The system includes: at least one storage medium including a set of instructions; and at least one processor in communication with the at least one storage medium; wherein when executing the set of instructions, the at least one processor is configured to direct the system to perform operations including: generating the speech based on a text with a speech synthesis model, wherein the speech synthesis model includes an embedding layer, a speech synthesis layer, and a position layer; and training the speech synthesis model when an evaluation index meets a preset condition, wherein the evaluation index includes one or more quality indexes determined based on at least a part of the text and at least a part of the speech.

According to some embodiments of the present disclosure, a non-transitory computer-readable storage medium is provided. The non-transitory computer-readable storage medium includes instructions that, when executed by at least one processor, direct the at least processor to perform a method for synthesizing a speech. The method includes: generating the speech based on a text with a speech synthesis model, wherein the speech synthesis model includes an embedding layer, a speech synthesis layer, and a position layer; and training the speech synthesis model when an evaluation index meets a preset condition, wherein the evaluation index includes one or more quality indexes determined based on at least a part of the text and at least a part of the speech.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which like reference numerals represent similar structures throughout the several views of the drawings, and wherein.

DETAILED DESCRIPTION

Figure 1:
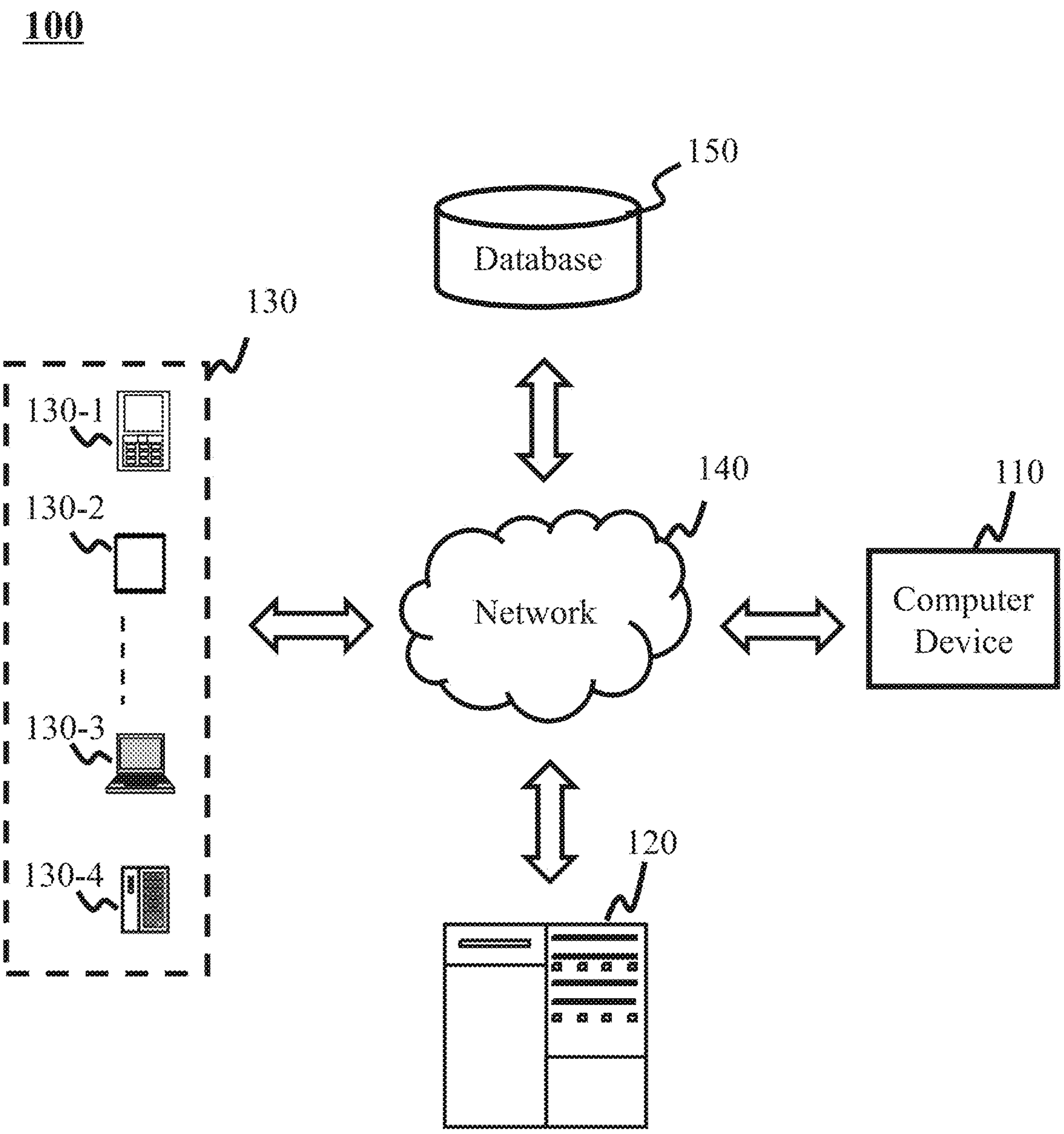
FIG. 1 is a schematic diagram illustrating an exemplary speech synthesis system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the terms "system," "unit," "module," and/or "block" used herein are one method to distinguish different components, elements, parts, sections, or assemblies of different levels in ascending order. However, the terms may be displaced by another expression if they achieve the same purpose.

The modules (or units, blocks, units) described in the present disclosure may be implemented as software and/or hardware modules and may be stored in any type of non-transitory computer-readable medium or other storage devices. In some embodiments, a software module may be compiled and linked into an executable program. It will be appreciated that software modules can be callable from other modules or from themselves, and/or can be invoked in response to detected events or interrupts. Software modules configured for execution on computing devices can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules (e.g., circuits) can be included of connected or coupled logic units, such as gates and flip-flops, and/or can be included of programmable units, such as programmable gate arrays or processors. The modules or computing device functionality described herein are preferably implemented as hardware modules, but can be software modules as well. In general, the modules described herein refer to logical modules that can be combined with other modules or divided into units despite their physical organization or storage.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes all combinations of one or more of the associated listed items.

It will be understood that, although the terms "first," "second," "third," etc., may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

FIG. 1 is a schematic diagram illustrating an exemplary speech synthesis system according to some embodiments of the present disclosure. The speech synthesis system 100 may include a computer device 110, a server 120, one or more terminals 130, a network 140, and a database 150. A user may synthesize a speech using the one or more terminals 130 through the network 140.

In some embodiments, the computer device 110 is configured to perform different functions in different application scenarios, e.g., order broadcast, news report, catering call, etc. In some embodiments, the computer device 110 transmits and/or receives wireless signals (e.g., a Wi-Fi signal, a Bluetooth signal, a ZigBee signal, an active radio-frequency identification (RFID) signal).

The server 120 may be a single server or a server group. The server group may be centralized or distributed (e.g., the server 120 may be a distributed system). In some embodiments, the server 120 may be local or remote. For example, the server 120 may access information and/or data stored in the computer device 110, the terminal(s) 130, and/or the database 150 via the network 140. As another example, the server 120 may be directly connected to the computer device 110, the terminal(s) 130, and/or the database 150 to access stored information and/or data. In some embodiments, the server 120 may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof. The server 120 may be connected to the network 140 to communicate with one or more components (e.g., the computer device 110, the terminal(s) 130, the database 150) of the system 100. In some embodiments, the server 120 may be directly connected to or communicate with one or more components (e.g., the computer device 110, the terminal(s) 130, the database 150) of the system 100.

The network 140 may facilitate exchange of information and/or data. In some embodiments, one or more components (e.g., the computer device 110, the server 120, the terminal(s) 130, the database 150) of the system 100 may transmit information and/or data to other component(s) of the system 100 via the network 140. In some embodiments, the network 140 may be any type of wired or wireless network, or combination thereof. Merely by way of example, the network 140 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 140 may include one or more network access points. For example, the network 140 may include wired or wireless network access points, through which one or more components of the system 100 may be connected to the network 140 to exchange data and/or information.

The terminal(s) 130, which may be connected to network 140, may be a mobile device 130-1, a tablet computer 130-2, a laptop computer 130-3, a built-in device 130-4, or the like, or any combination thereof. In some embodiments, the mobile device 130-1 may include a wearable device, a smart mobile device, a virtual reality device, an augmented reality device, or the like, or any combination thereof. In some embodiments, a user may control the computer device 110 by the wearable device, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a HoloLens, a Gear VR, etc. In some embodiments, built-in device 130-4 may include an onboard computer, an onboard television, etc. The terminal(s) 130 may act as sensors to detect information. For another example, processor 210 and storage 220 may be parts of the smart phone. In some embodiments, the terminal(s) 130 may also act as a communication interface for user of the computer device 110. For example, a user may touch a screen of the terminal(s) 130 to select synthesis operations of the computer device 110.

The database 150 may store data and/or instructions. In some embodiments, the database 150 may store data obtained from the computer device 110, the server 120, the terminal(s) 130, an external storage device, etc. In some embodiments, the database 150 may store data and/or instructions that the server 120 may execute or use to perform exemplary methods described in the present disclosure. In some embodiments, the database 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the database 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the database 150 may be connected to the network 140 to communicate with one or more components (e.g., the computer device 110, the server 120, the terminal(s) 130) of the system 100. One or more components of the system 100 may access the data or instructions stored in the database 150 via the network 140. In some embodiments, the database 150 may be directly connected to or communicate with one or more components (the computer device 110, the server 120, the terminal(s) 130) of the system 100. In some embodiments, the database 150 may be part of the server 120. For example, the database 150 may be integrated into the server 120.

It should be noted that the system 100 described above is merely provided for illustrating an example of the system, and not intended to limit the scope of the present disclosure. For persons having ordinary skills in the art, multiple variations or modifications may be made under the teachings of the present disclosure. However, those variations and modifications do not depart from the scope of the present disclosure.

Figure 2:
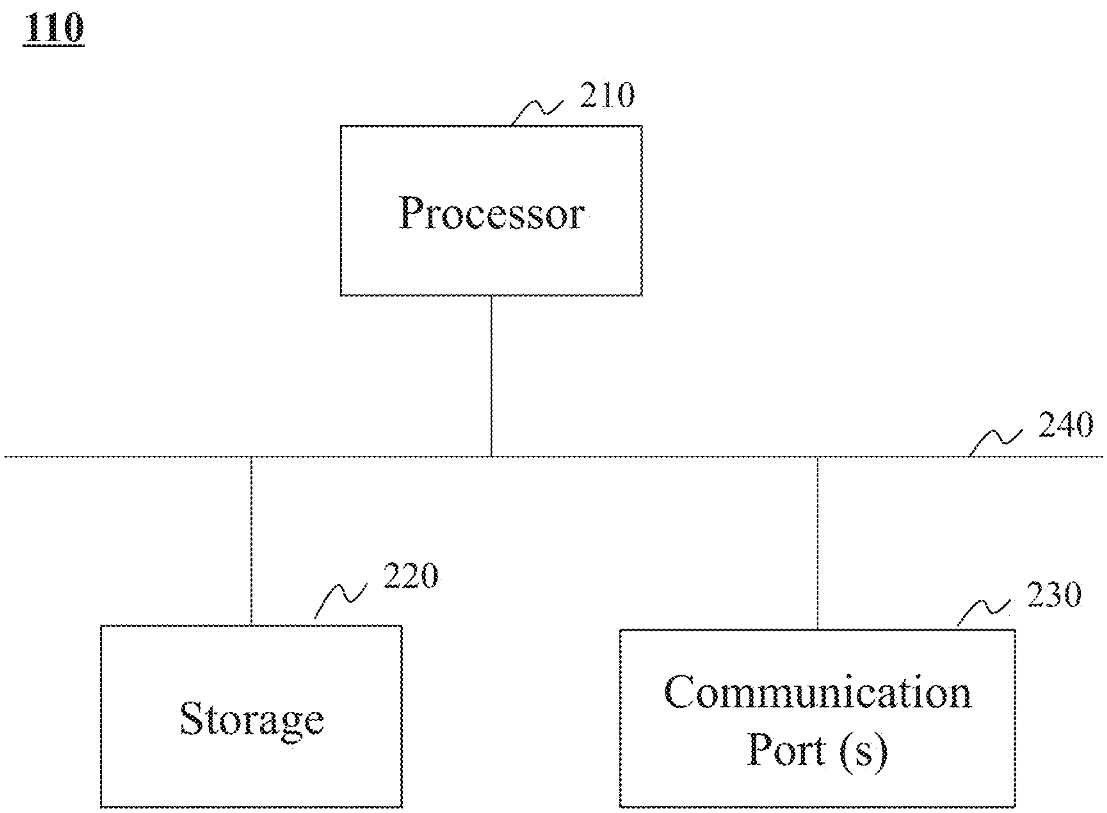
FIG. 2 is a schematic diagram illustrating an exemplary computer device according to some embodiments of the present disclosure.

FIG. 2 is a schematic diagram illustrating an exemplary computer device according to some embodiments of the present disclosure. The computer device 110 may include a processor 210, a storage 220, communication port (s) 230, and a bus 240. In some embodiments, the processor 210, the storage 220, and the communication port (s) 230 may be connected via the bus 240 or other means.

The processor 210 may include one or more processors (e.g., single-core processor(s) or multi-core processor(s)). Merely by way of example, the processor 210 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The storage 220 may store instructions for the processor 210, and when executing the instructions, the processor 210 may perform one or more functions or operations described in the present disclosure. For example, the storage 220 may store instructions executed by the processor 210 to process the information. In some embodiments, the storage 220 may automatically store the information. In some embodiments, the storage 220 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), or a digital versatile disk ROM.

The communication port (s) 240 may be port (s) for communication within the computer device 110. That is, the communication port (s) 240 may exchange information among components of the computer device 110. In some embodiments, communication port (s) 240 may transmit information/data/signals of the processor 210 to an internal part of the computer device 110 as well as receive signals from an internal part of the computer device 110. For example, the processor 210 may transmit synthesis operations through the communication port (s) 240. The transmitting-receiving process may be realized through the communication port (s) 240. The communication port (s) 240 may receive various wireless signals according to certain wireless communication specifications. In some embodiments, the communication port (s) 240 may be provided as a communication module for known wireless local area communication, such as Wi-Fi, Bluetooth, Infrared (IR), Ultra-Wide band (UWB), ZigBee, and the like, or as a mobile communication module, such as 3G, 4G, or Long-Term Evolution (LTE), or as a known communication method for a wired communication. In some embodiments, the communication port (s) 240 is not limited to the element for transmitting/receiving signals from an internal device, and may be implemented as an interface for interactive communication. For example, the communication port (s) 240 may establish communication between the processor 210 and other parts of the computer device 110 by circuits using Application Program Interface (API). In some embodiments, the terminal(s) 130 may be a part of the computer device 110. In some embodiments, communication between the processor 210 and the terminal(s) 130 may be carried out by the communication port (s) 240.

Figure 3:
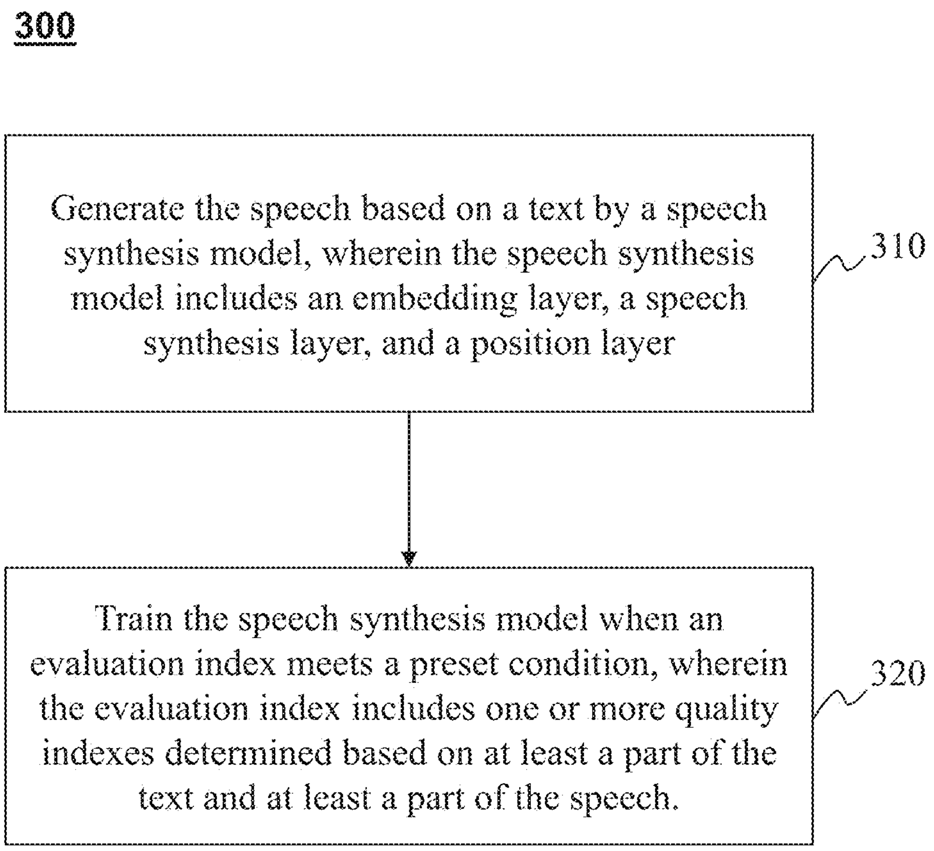
FIG. 3 is a flowchart illustrating an exemplary process for synthesizing the speech according to some embodiments of the present disclosure.

FIG. 3 is a flowchart illustrating an exemplary process for synthesizing the speech according to some embodiments of the present disclosure. In some embodiments, the process 300 may include the following steps.

In step 310, a speech may be generate based on a text with a speech synthesis model, wherein the speech synthesis model includes an embedding layer, a speech synthesis layer, and a position layer. In some embodiments, the step 310 may be performed by a generating module 710.

In some embodiments, the text may be composed of any language, such as English, Chinese, Japanese, or the like, or any combination thereof. In some embodiments, the text may include symbols, such as comma, full stop, quotation mark, or the like, or any combination thereof.

In some embodiments, the speech corresponding to the text may be composed of any language, such as English, Chinese, Japanese, or the like, or any combination thereof.

In some embodiments, the speech synthesis model (i.e., speech synthesis system) may be implemented based on end-to-end neural network, therefore, the speech synthesis model may also be called a speech synthesis neural network model. In some embodiments, the speech synthesis model may be an end-to-end speech synthesis model based on an attention mechanism, and the attention mechanism is an attempt to implement the same action of selectively concentrating on a few relevant things, while ignoring others in deep neural networks. In some embodiments, the speech synthesis model may be an autoregression model, such as a Tacotron model. The Tacotron model is the first end-to-end TTS neural network model, and the Tacotron model takes characters as input and output the corresponding raw spectrogram, which is then fed to the Griffin-Lim reconstruction algorithm to synthesize speech.

In some embodiments, the speech synthesis model may be configured to synthesize text into speech. Specifically, taking a text as an input of the speech synthesis model, and the speech synthesis model may output a speech corresponding to the text and a stop token, wherein the stop token indicates where the speech should stop.

In some embodiments, the speech synthesis model may include the embedding layer, the speech synthesis layer, and the position layer. The embedding layer may be used for neural networks on text data and may be the first hidden layer of the neural networks. The embedding layer may be initialized with random weights and will learn an embedding for all the words in the training dataset. The embedding layer may project the input text into feature vectors. The speech synthesis layer may be configured to synthesize the speech based on the feature vectors projected by the embedding layer. The position layer may be configured to predict a stop token, which is configured to end the synthesis process.

In some embodiments, the speech synthesis model may realize speech synthesis, which is also called text-to-speech (TTS), and may convert any input text into corresponding speech. In some embodiments, the text may be processed when the speech synthesis model receives the speech synthesis requirements, wherein the speech synthesis requirements may be triggered by users.

In step 320, the speech synthesis model may be trained when an evaluation index meets a preset condition, wherein the evaluation index includes one or more quality indexes determined based on at least a part of the text and at least a part of the speech. In some embodiments, the step 320 may be performed by a training module 720.

In general, the speech synthesis is a technology to convert any input text into corresponding speech based on the speech synthesis model, so the effect of speech synthesis is related to the evaluation of the speech synthesis model.

In some embodiments, the evaluation index may be configured to determine whether to update the speech synthesis model, specifically, when the evaluation index meets the preset condition, the speech synthesis model may be trained to updated. In some embodiments, the evaluation index may include one or more quality indexes determined based on at least a part of the text and at least a part of the speech. In some embodiments, the one or more quality indexes may be configured to reflect the quality of the speech, that is the accuracy of the speech synthesis model.

In some embodiments, the preset condition may represent the standard that the speech synthesis model needs to be updated. For example, the evaluation index may be expressed as a score, and the preset condition may be 60 points, that is, when the evaluation index is less than 60 points, the speech synthesis model needs to be updated, and when the evaluation index is larger than or equal to 60 points, the speech synthesis model does not need to be updated. For example, the evaluation index may be expressed as "qualified" and "unqualified", and the preset condition may be "qualified", that is, when the evaluation index is "unqualified", the speech synthesis model needs to be updated, and when the evaluation index is "qualified", the speech synthesis model does not need to be updated.

In some embodiments, the evaluation index may include a first effect score, and the first effect score may be configured to evaluate the effect of the speech synthesis model. In general, speech signal is a quasi-steady-state signal, and the speech frames may refer to shorter frames obtained by framing the speech signal, for example, a speech frame may be 10 ms. Examples of the characters of the text may include letters, numerical digits, common punctuation marks (such as "." or "-"), and whitespace. Specifically, a first weight matrix may be generated based on the text with the speech synthesis model, wherein elements in the first weight matrix are configured to represent a probability that the speech frames of the speech are aligned with the characters of the text.

In some embodiments, when the text is synthesized to the speech with the speech synthesis model, the speech may be output as the speech frames.

Specifically, when the text is synthesized to the speech with the speech synthesis model, the speech may be output as the speech frames automatically (i.e., automatically output frame by frame).

In some embodiments, when the text is synthesized to the speech with the speech synthesis model, and when the first weight matrix is generated, the text may be converted into characters. Specifically, in order to facilitate the determination of each element in the first weight matrix, the text may be converted into characters, for example, the Chinese in the text may be converted into Pinyin, to obtain the probability that the speech frames of the speech are aligned with the characters of the text.

In some embodiments, the first effect score of the speech synthesis model may be obtained based on one or more of a total count of the speech frames, a total count of the characters, and the first weight matrix.

In some embodiments, the total count of the speech frames and the total count of the characters may be determined. Since the text contains one or more characters and the speech contains one or more speech frames, the total count of the speech frames and the total count of the characters may be determined.

Figure 4:
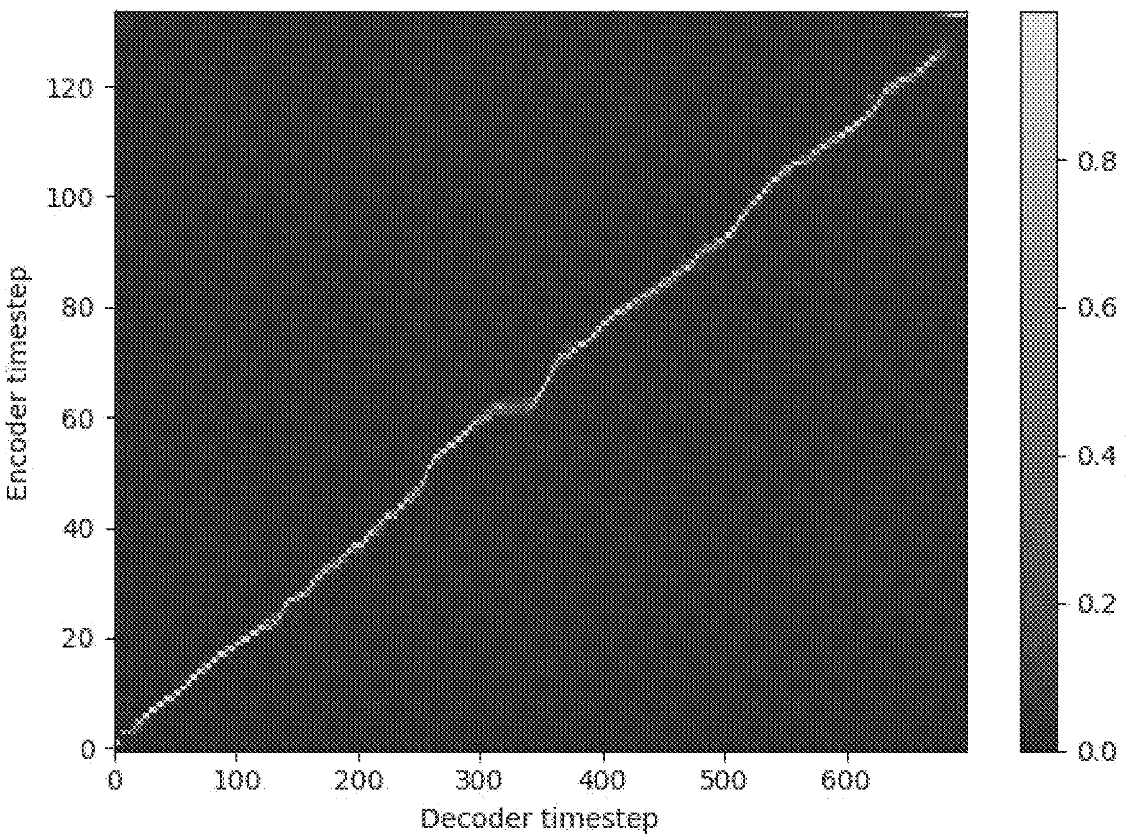
FIG. 4 is a visual display diagram illustrating an exemplary first weight matrix according to some embodiments of the present disclosure.

FIG. 4 is a visual display diagram illustrating an exemplary first weight matrix according to some embodiments of the present disclosure. As shown in FIG. 4, the horizontal axis (i.e., decoder timestep) may represent the speech frame of the speech output with the speech synthesis model, and the vertical axis (i.e., encoder timestep) may represent the characters of the text input to the speech synthesis model. Each weight in the first weight matrix may correspond to a square in FIG. 4, and the color of the square may represent the size of the weight, ranging from 0 to 1. The closer the weight is to the diagonal, the greater the probability that the speech frames of the speech are aligned with the characters of the text, and the higher the accuracy of the speech synthesis model. Specifically, the first effect score of the speech synthesis model may be obtained based on the relationship between the weights and the diagonal in the first weight matrix. For example, if more than 80% of the weights locate on the diagonal in the first weight matrix, the first effect score may be 80 points, which indicates that the effect of the speech synthesis model is good and the speech synthesis model is qualified.

In some embodiments, in order to evaluate the effect of the speech synthesis model, when the text is synthesized to the speech with the speech synthesis model (generally the end-to-end speech synthesis model based on the attention mechanism) for output (that is, the output speech may be obtained based on the text with the speech synthesis model), the first weight matrix may be generated to subsequently determine the importance index of each weight in the first weight matrix, and a second weight matrix may be formed according to the importance index of the each weight. Detailed description of forming the second weight may be found in FIG. Y.

In some embodiments, the evaluation index may include a second effect score, and the second effect score may be configured to evaluate the accuracy of the stop tokens predicted with the speech synthesis model.

In some embodiments, the second effect score of the speech synthesis model may be generated based on at least one of a duration of the speech and a correct ending position of a sentence corresponding to the speech. In some embodiments, when processing the text with the speech synthesis model, the stop token (or so-called end identifier) of each sentence in the text may be configured to determine whether the sentence needs to end.

In some embodiments, whether the sentence ends correctly may be determined based on the duration (such as 10 s, 1 min, etc.) of the corresponding speech. Specifically, whether the duration of the speech is greater than or equal to a preset first target threshold may be determined, wherein the unit of the first target threshold is time. If the duration of the speech is greater than or equal to the first target threshold, the sentence does not end correctly, that is, the speech synthesis model does not make a correct ending operation for the sentence; and if the duration of the speech is less than the first target threshold, the sentence ends correctly, that is, the speech synthesis model makes the correct ending operation for the sentence, and the speech synthesis model may process a next sentence.

In some embodiments, the sentence that does not end correctly may be designated as an abnormal sentence. In some embodiments, the correct ending position of the abnormal sentence may be determined. In some embodiments, the correct ending position of the sentence may be determined by obtaining a recognized result based on the speech and determining the correct ending position of the abnormal sentence based on the recognized result. Specifically, the recognized result of the speech may be compared with the text in which the sentence is located, and the correct ending position of the abnormal sentence may be detected based on the comparison result, wherein the recognized result is the sentence corresponding to the speech. For example, recognized result is valid phoneme+invalid phoneme, the recognition result may be compared with the text to determine that the correct end position is behind the valid phonemes.

In some embodiments, the speech synthesis model may be trained when the evaluation index meets the preset condition. Specifically, the speech synthesis model may be trained based on an abnormal training database, wherein the abnormal training database is configured to store the abnormal sentence and the correct ending position of the abnormal sentence.

In some embodiments, a polarity of the abnormal sentences and the correct ending positions of the abnormal sentences may be obtained by repeating the steps for determining the abnormal sentences and the corresponding correct ending positions, and hence the abnormal training database may store the polarity of the abnormal sentences and the corresponding correct ending positions.

In some embodiments, the training process may include generating an embedding feature based on the abnormal sentence in the abnormal training database by the embedding layer, and training the position layer based on the embedding feature, wherein the position layer takes the embedding feature as a training sample and the correct ending position of the abnormal sentence as a label, and the position layer is configured to update the speech synthesis model.

In some embodiments, whether a count of the abnormal sentence is greater than or equal to a preset second target threshold may be determined. Specifically, if the count of the abnormal sentence is greater than or equal to the preset second target threshold, the speech synthesis model may be trained based on the abnormal training database.

In some embodiments, whether a duration between a target time and a current time reaches a specified duration may be determined. Specifically, if the duration between the target time and the current time reaches the specified duration, the speech synthesis model may be trained based on the abnormal training database, wherein the target time is the time at which the first sentence in the text is processed with the speech synthesis model described above, or the target time is the time at which the abnormal training database was first updated.

In some embodiments, the data in the abnormal training database may be added to the original database to train the speech synthesis model. In some embodiments, the speech synthesis model may be retained by a migration technology, and the problem that the sentence cannot end correctly without destroying the original speech synthesis effect of the speech synthesis model may be solved.

In some embodiments, after the training process of the speech synthesis model, an updated speech synthesis model may be obtained, and an automatic optimization speech synthesis models may be implemented by replacing the original speech synthesis mode with the updated speech synthesis model.

By automatically updating the speech synthesis model, the problem that the speech synthesis model cannot correctly end the sentence may be solved. Automatic updating of the speech synthesis model may eliminate manual intervention and reduce maintenance costs. In addition, there is no need to expand the original training data, which greatly reduces the data cost. Moreover, users may train the speech synthesis model according to their own strategies, which improves the stability of speech synthesis and greatly improves the product experience.

In some embodiments, the effect of the speech synthesis model may be obtained based on both duration between the target time and the current time reaches the specified duration and the first effect score. Specifically, the effect of the speech synthesis model may be obtained based on the weights of the duration and the first effect score, for example, if the score value of the duration is 40 points, the weight of the duration is 0.3, the score value of the first effect score is 60 points, and the weight of the duration is 0.7, the total value of the effect of the speech synthesis model may be obtained by the weight formula: 40*0.3+60*0.7=54 points, as a result, if the qualify value is 60 points, the total value is less than the qualify value, that is the speech synthesis model is unqualified.

In some embodiments, the speech synthesis model may be trained based on a speech cloning technology. Detailed description of training the speech synthesis model based on the speech cloning technology may be found in FIG. 5.

Figure 5:
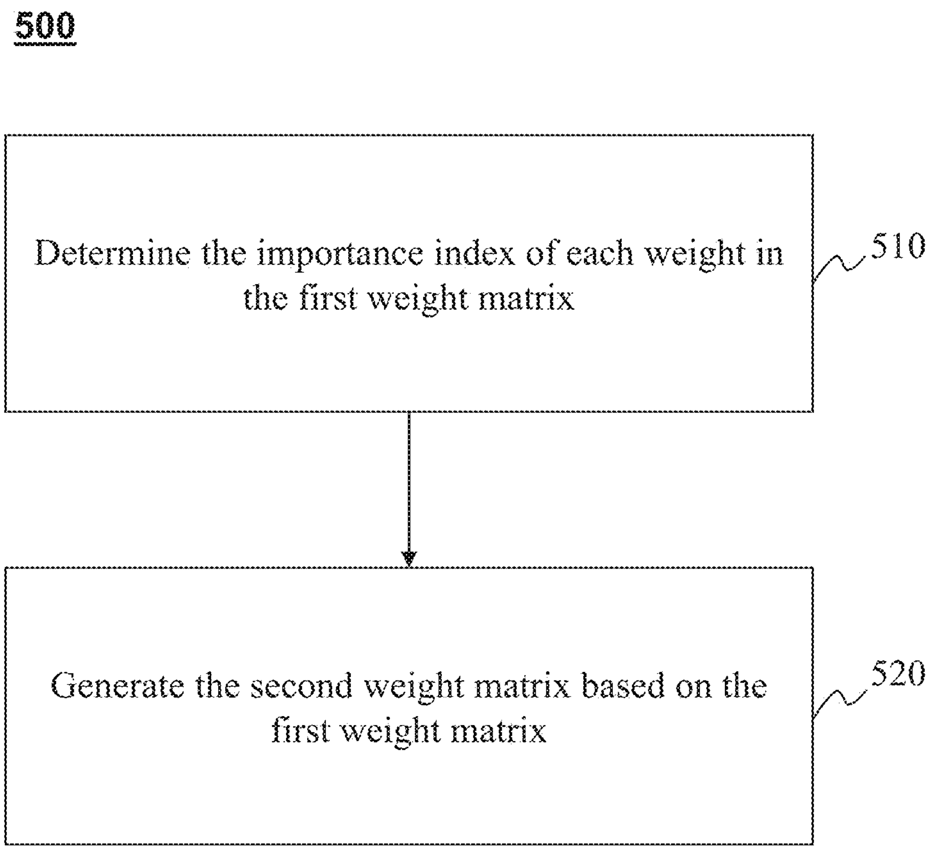
FIG. 5 is a flowchart illustrating an exemplary process for form a second weight according to some embodiments of the present disclosure.

FIG. 5 is a flowchart illustrating an exemplary process for forming the second weight according to some embodiments of the present disclosure.

After the first weight matrix is obtained, the importance index of each weight in the first weight matrix may be obtained through corresponding calculation methods. The specific calculation methods may not be limited, and may be set according to the actual situations. For example, the projection of evaluation space and unit evaluation space may be established to obtain fuzzy relation equations, and the importance index of each weight in the first weight matrix may be determined using the fuzzy relation equations. The second weight matrix may be formed based on the importance index of each weight, and the elements in the second weight matrix may be correspond to the elements in the first weight matrix one by one, so that a second effect score of the speech synthesis model may be determined subsequently by the first weight matrix and the second weight matrix.

In some embodiments, the process 500 may include the following steps.

In step 510, the importance index of each weight in the first weight matrix may be determined. In some embodiments, the step 510 may be performed by the training module 720.

In some embodiments, the importance index of each weight in the first weight matrix may be determined. Specifically, an optimal position of a character corresponding to a current speech frame may be determine based on a frame sequence number of the current speech frame, the total count of the speech frames, and the total count of the characters, wherein the optimal position of the character corresponding to the current speech frame is the character position of the current speech frame corresponding to the diagonal in the first weight matrix distribution diagram, a size relationship between the optimal position of the character corresponding to the current optimal frame and a corresponding first difference may be compared, and a maximum distance between the position of the character corresponding to the current speech frame and the optimal position of the corresponding character may be determined based on the size relationship to obtain a first distance, wherein the first difference is the difference between the total count of characters and the optimal position of the characters corresponding to the current speech frame, the position of the character corresponding to the current speech frame may be subtracted from the optimal position of the character corresponding to the current speech frame to obtain a second difference, and an absolute value for the second difference may be took, wherein the absolute value is an actual distance between the position of the character corresponding to the current speech frame and the optimal position of the corresponding character, which is recorded as the second distance, and the importance index of the current weight may be determined based on the ratio of the second distance and the first distance, wherein the current weight is the probability that the current speech frame aligns the character of the corresponding text.

In some embodiments, due to the alignment of the text and the speech frames in speech synthesis, the larger weights in the obtained first weight matrix may be distributed on the diagonal in the first weight matrix distribution diagram for a well-trained speech synthesis model. Specifically, a first quotient value may be obtained by dividing the frame sequence number of the current speech frame by the total count of the speech frames, the optimal position of the character corresponding to the current speech frame may be obtained by multiplying the first quotient value by the total count of the characters, that is, the position of the character corresponding to the current speech frame on the diagonal in the first weight matrix distribution diagram, a first distance and a second distance may be calculated, a second quotient value may be obtained by dividing the second distance by the first distance, and then the importance index of the current weight may be obtained by subtracting the second quotient value from 1. Specifically, the specific calculation formula is as follows:

$$\hat{n}_t = \frac{t}{T} * N$$

-continued $$\tilde{g}_t = (\hat{n}_t > N - \hat{n}_t)\ ?\ \hat{n}_t : N - \hat{n}_t$$

$$g_{nt} = \text{abs}(n - \hat{n}_t)$$

$$W_{nt} = 1 - \frac{g_{nt}}{\tilde{g}_t}$$

wherein $\hat{n}_t$ denotes the optimal position of t-th speech frame, T denotes the total count of the speech frames, N denotes the total count of the characters, $\tilde{g}_t$ denotes the maximum distance between the position of the character corresponding to the t-th speech frame and the optimal position of the corresponding character, that is the first distance, abs denotes the absolute value, $g_{nt}$ denotes the actual distance between the position of the character corresponding to the t-th speech frame and the optimal position of the corresponding character, that is the second distance, $W_{nt}$ denotes the importance index of the probability that n-th character aligns the t-th speech frame.

In step 520, the second weight matrix may be generated based on the first weight matrix. In some embodiments, the step 520 may be performed by the training module 720.

In some embodiments, the second weight matrix may be generated based on the first weight matrix. Specifically, the second weight matrix may be a two-dimensional diagram, the importance index of each weight in the second weight matrix may be related to the distance between the position and the diagonal in the first weight matrix, for example, the closer the position is to the diagonal, the higher the weight in the second weight matrix.

In some embodiments, the first effect score of the speech synthesis model may be determined based on the first weight matrix and the second weight matrix, wherein the first effect score is configured to evaluate the effect of the speech synthesis model. Specifically, the first effect score of the speech synthesis model may be determined based on the total count of speech frames, the total count of the characters, the first weight matrix, and the second weight matrix, the specific calculation formula is as follows:

$$\text{score}=\Sigma_{t=0}{}^{T}\Sigma_{n=0}{}^{N}W_{nt}A_{nt}*100/T$$

wherein score denotes the first effect score, $A_{nt}$ denotes the probability that the t-th speech frame aligns the n-th character in the first weight matrix.

The accuracy of the evaluation result of the speech synthesis model and the training efficiency of the speech synthesis model may be improved using the first effect score of the speech synthesis model as the evaluation index of the speech synthesis model without any additional speech recognition modules. Moreover, since the evaluation result of the speech synthesis model is not dependent on the effect of the speech recognition module, the evaluation result may be more objective.

No additional speech recognition module is needed. By using the score of the preset model as the evaluation index of the speech synthesis model, the accuracy of the evaluation result of the speech synthesis model is improved and the training efficiency of the preset model is improved.

Figure 6:
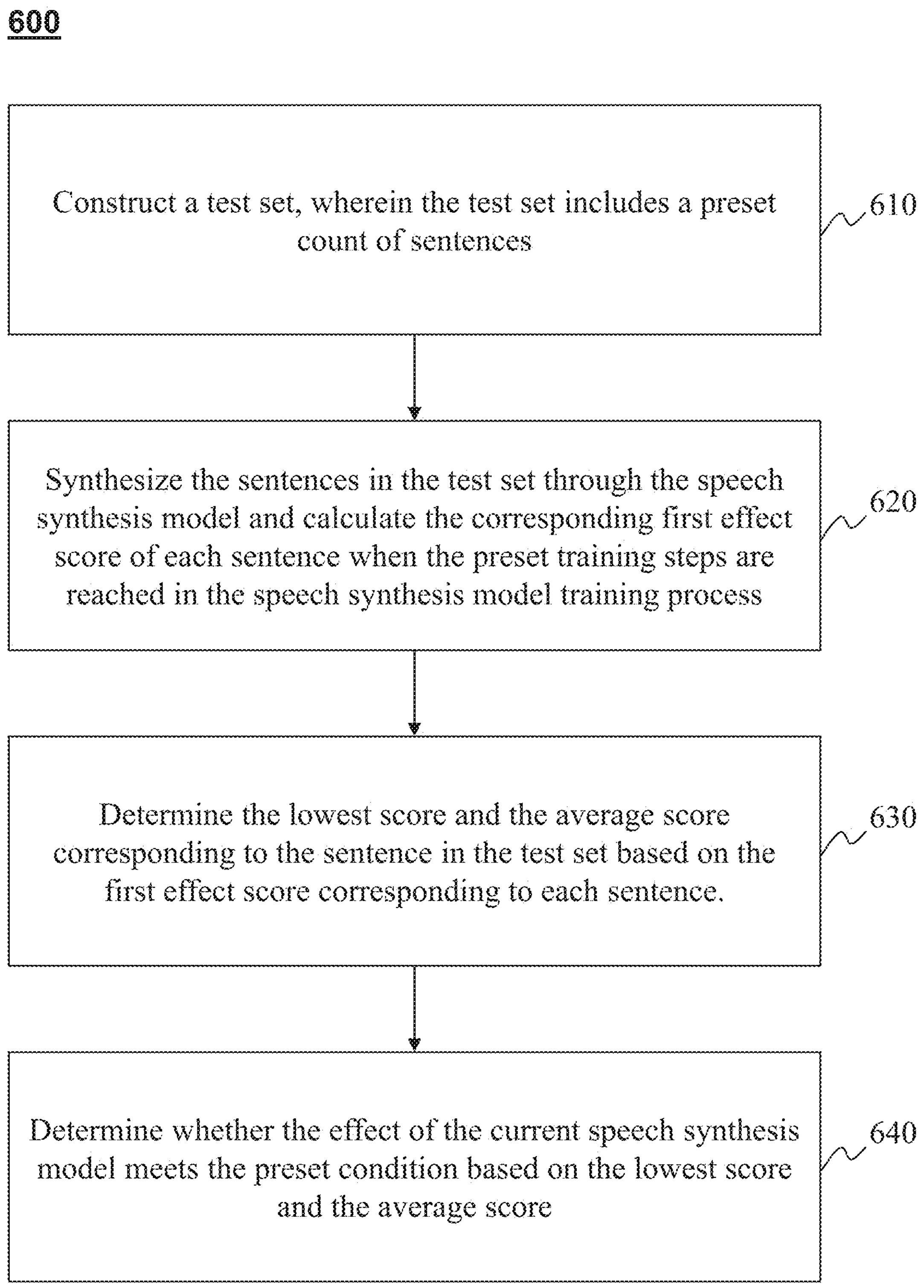
FIG. 6 is a flowchart illustrating an exemplary process for training the speech synthesis model based on a speech cloning technology according to some embodiments of the present disclosure.

FIG. 6 is a flowchart illustrating an exemplary process for training the speech synthesis model based on the speech cloning technology according to some embodiments of the present disclosure. In some embodiments, the process 600 may include the following steps.

In step 610, a test set may be constructed, wherein the test set includes a first preset count of sentences. In some embodiments, the step 610 may be performed by the training module 720.

In some embodiments, when the speech synthesis model is trained based on the speech cloning training process, the test set may be constructed first, wherein the test set may include the first preset count of sentences. In some embodiments, the first preset count may be set artificially. The test set may be configured to test the speech synthesis model to determine whether the speech synthesis model meets the preset condition.

In the prior art, the speech may be synthesized based on the test text through the model using a distance criterion, such as Mel Cepstral Distortion (MCD) method, to measure the distance between the synthetic speech and the original speech corresponding to the test text, and the distance may be taking as the model evaluation result of the model. However, the problem of this scheme is that a part of the samples in the training set need to be used as the test set, and hence here are great restrictions on the application scenarios with few training samples such as speech cloning, and the universality of the model is not high. In the present disclosure, the sentence in the test set may be selected randomly, which is not affected by the training samples, and the finally obtained model may be stronger applicability.

In step 620, the sentences in the test set may be synthesized through the speech synthesis model and the corresponding first effect score of each sentence may be calculated when the preset training steps are reached in the speech synthesis model training process. In some embodiments, the step 620 may be performed by the training module 720.

In some embodiments, the preset training steps may be preset by the designer or set according to experience, such as 1000 steps.

In some embodiments, each time the preset training steps are reached in the preset model training process, each sentence in the test set (i.e., the text) may be synthesized through the speech synthesis model and the corresponding first effect score of each sentence may be calculated by the above method. For example, taking a sentence as the text, when the sentence is input to the speech synthesis model to synthesize the speech, the first effect score of the speech synthesis model may be determined by the first weight matrix and the second weight matrix, wherein the first effect score is corresponding to the sentence, so that a lowest score and an average score corresponding to the sentence in the test set may be determined based on the first effect score corresponding to each sentence.

In step 630, the lowest score and the average score corresponding to the sentence in the test set may be determined based on the first effect score corresponding to each sentence. In some embodiments, the step 630 may be performed by the training module 720.

In some embodiments, the lowest score and the average score corresponding to the sentence in the test set may be determined based on the first effect score corresponding to each sentence. Specifically, since the test set includes the preset first number of sentences, that is, there is more than one sentence, and hence the calculated score is more than one, so that the lowest score and the average score corresponding to the sentence in the test set may be determined based on the first effect score corresponding to each sentence to determine whether the effect of the current speech synthesis model meets the preset condition based on the lowest score and the average score.

In step 640, whether the effect of the current speech synthesis model meets the preset condition may be determined based on the lowest score and the average score. In some embodiments, the step 640 may be performed by the training module 720.

In some embodiments, whether the effect of the current speech synthesis model meets the preset condition may be determined based on the lowest score and the average score. Specifically, whether the lowest score reaches a first preset lowest threshold and the average score reaches a second preset lowest threshold may be determined after obtaining the lowest score and the average score, and then whether the effect of the current speech synthesis model meets the preset condition may be determined, that is, whether the current speech synthesis model should stop training may be determined.

In some embodiments, when the lowest score reaches the first preset lowest threshold, the average score reaches the second preset lowest threshold, and the first effect score of preset times is no longer increased, the training for the current speech synthesis model may be stopped, and the effect of the current speech synthesis model meets the preset condition. Specifically, when the lowest score reaches the first preset lowest threshold, the average score reaches the second preset lowest threshold, and the first effect score of preset times is no longer increased, it may indicate that the effect of the current speech synthesis model meets the preset condition, and the training for the speech synthesis model may end.

In some embodiments, the first preset lowest threshold and the second preset lowest threshold may be set artificially, such as set by experience. In some embodiments, the preset times may be set artificially, such as three times.

In the existing speech cloning model training process, there is no unified scheme for when the model training ends. In addition to manual evaluation, it is often to set a fixed number of training steps according to experience. However, if a fixed count of training steps is set, it is easy to lead to insufficient model training and occupy resources to continue training after full model training, which requires manual intervention. The embodiments of the present disclosure may accurately obtain the time to stop model training by reaching the first preset lowest threshold with the lowest score, reaching the second preset lowest threshold with the average score and no increase in the scores of preset times, and hence saving human and material resources, and improving the efficiency of model training at the same time.

In some embodiments, when the training steps of the speech synthesis model training reaches a preset maximum count of training steps, and the lowest score does not reach the first preset lowest threshold or the average score does not reach the second preset lowest threshold, the training for the speech synthesis model may be stopped, that is, the effect of the current speech synthesis model does not meet the preset condition, and the preset maximum count of training steps may include a second preset count of training steps, wherein the preset second count is greater than or equal to the preset times. In some embodiments, the preset maximum count of training steps may be set artificially, such as 5000 steps, 10000 steps, etc. In some embodiments, the preset maximum count of training steps may be an integer multiple of the preset count of training steps.

When the speech synthesis model training reaches the preset maximum steps, if the lowest score does not reach the first preset lowest threshold or the average score does not reach the second preset lowest threshold, it may indicate that the effect of the current speech synthesis model does not meet the preset condition. At this time, the model training may be stopped and the current speech synthesis model may be modified accordingly to avoid waste of resources and make rational use of computing resources.

The time when the speech synthesis model should stop training may be determine based on the method of the present disclosure, hence computing resources may be used rationally, waste of resources may be avoided, and the efficiency of model training may be improved.

Figure 7:
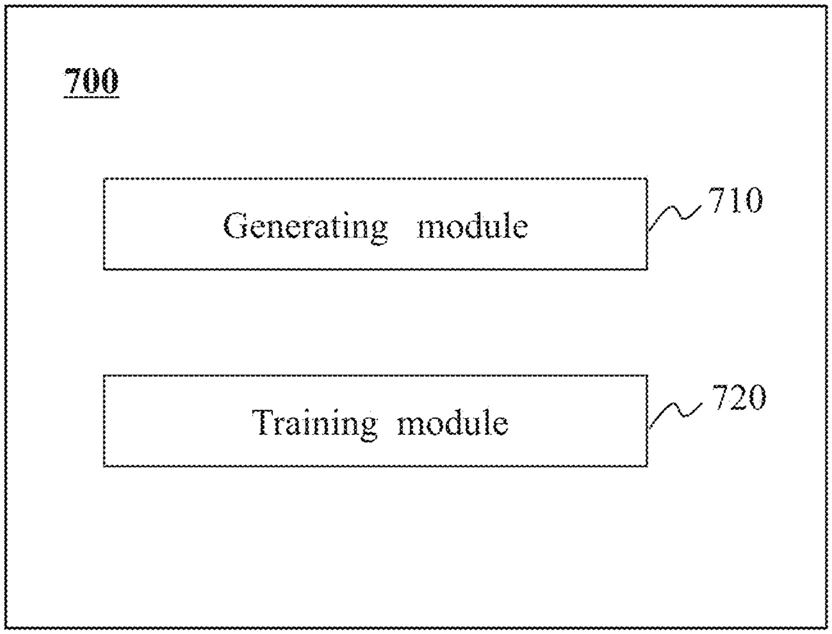
FIG. 7 is a block diagram illustrating an exemplary system for synthesizing the speech according to some embodiments of the present disclosure.

FIG. 7 is a block diagram illustrating an exemplary system for synthesizing the speech according to some embodiments of the present disclosure. As shown in FIG. 7, the system 700 may include the generating module 710 and the training module 720.

The processing devices and the modules shown in FIG. 7 may be implemented in a variety of ways. For example, in some embodiments, the devices and the modules may be implemented by hardware, software, and/or a combination of both. Specifically, the hardware may be implemented using dedicated logic, the software may be stored in the storage and be executed by the appropriate instruction execution system (e.g., a microprocessor or a dedicated design hardware). For those skilled in the art, the above processing devices and modules may be implemented by computer executable instructions. The system and the modules of the present specification may be implemented by hardware such as a very large-scale integrated circuit, a gate array, a semiconductor (e.g., a logic chip and/or a transistor), or a hardware circuit of a programmable device (e.g., a field programmable gate array and/or a programmable logic device). The system and the modules of the present specification may also be implemented by software executable by various types of processors, and/or by a combination of above-mentioned hardware and software (e.g., a firmware).

It should be noted that the above description of the system 700 and its modules is only intended to be illustrative and not limiting to the scope of the embodiments. A person having ordinary skill in the art, with understanding of the principles behind the system above and without deviating from these principles, may combine different parts of the system in any order and/or create a sub-system and connect it with other parts. For example, one device may have different modules for the generating module 710 and the training module 720 in FIG. 7, or have one module that achieves two or more functions of these three modules. For another example, each module in the system 700 may share one storage module, or have an individual storage unit of its own. For yet another example, the generating module 710 may be a separate component without being a module inside the system 700. Such variations are all within the scope of this specification.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the features, structures or characteristics may be combined as suitable in one or more embodiments of the present disclosure.

Further, it will be appreciated by one skilled in the art, aspects of the present disclosure may be illustrated and described herein in any of a count of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python, or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in smaller than all features of a single foregoing disclosed embodiment.

We claim:

1. A method, that is implemented on a computing device having at least one processor and at least one storage medium including a set of instructions for synthesizing a speech, comprising:

generating the speech based on a text with a speech synthesis model, wherein the speech synthesis model is configured to output the speech corresponding to the text and a stop token indicating where the speech should stop;

obtaining an evaluation index, wherein the evaluation index includes a second effect score of the speech synthesis model, and the second effect score is generated based on at least one of a duration of the speech and a correct ending position of a sentence corresponding to the speech; and training the speech synthesis model when the evaluation index meets a preset condition.

2. The method of claim 1, wherein the stop token is used to determine the end of the sentence corresponding to the speech, and the second effect score is used to evaluate the accuracy of the stop token predicted with the speech synthesis model.

3. The method of claim 2, wherein obtaining the evaluation index further includes:

designating the sentence corresponding to the speech that has a duration greater than or equal to a first target threshold as an abnormal sentence.

4. The method of claim 2, wherein obtaining the evaluation index further includes:

obtaining a recognized result based on the speech and determining a correct ending position of the sentence corresponding to the speech based on the recognized result;

determining a correct ending position of an abnormal sentence based on the recognized result; and designating the sentence corresponding to the speech that does not end at the correct ending position as the abnormal sentence.

5. The method of claim 4, wherein the recognized result includes valid phoneme and invalid phoneme, and the determining the correct ending position of the sentence corresponding to the speech based on the recognized result includes:

comparing the recognized result with the text corresponding to the speech; and determining the correct ending position of the sentence corresponding to the speech based on the comparison result.

6. The method of claim 1, wherein the second effect score is represented by a count of abnormal sentence, and the preset condition includes the count of the abnormal sentence is greater than or equal to a second target threshold.

7. The method of claim 1, wherein the evaluation index further includes a first effect score of the speech synthesis model, and the method further including:
obtaining the first effect score of the speech synthesis model based on one or more of a total count of the speech frames, a total count of the characters, and a first weight matrix;
wherein the first weight matrix is generated based on the text with the speech synthesis model, and elements in the first weight matrix are configured to represent a probability that speech frame of the speech is aligned with characters of the text.

8. The method of claim 1, wherein:
the speech synthesis model includes an embedding layer, a speech synthesis layer, and a position layer.

9. The method of claim 8, wherein the training the speech synthesis model when the evaluation index meets the preset condition includes:
training the speech synthesis model based on an abnormal training database, wherein the abnormal training database is configured to store an abnormal sentence and the correct ending position of the abnormal sentence.

10. The method of claim 9, wherein the training includes:
generating an embedding feature based on the abnormal sentence in the abnormal training database by the embedding layer; and
training the position layer based on the embedding feature, wherein the position layer takes the embedding feature as a training sample and the correct ending position of the abnormal sentence as a label, and the position layer is configured to update the speech synthesis model.

11. A system for synthesizing a speech, comprising:
at least one storage medium including a set of instructions; and
at least one processor in communication with the at least one storage medium;
wherein when executing the set of instructions, the at least one processor is configured to direct the system to perform operations including:
generating the speech based on a text with a speech synthesis model, wherein the speech synthesis model is configured to output the speech corresponding to the text and a stop token indicating where the speech should stop;
obtaining an evaluation index, wherein the evaluation index includes a second effect score of the speech synthesis model, and the second effect score is generated based on at least one of a duration of the speech and a correct ending position of a sentence corresponding to the speech; and
training the speech synthesis model when the evaluation index meets a preset condition.

12. The system of claim 11, wherein the stop token is used to determine the end of the sentence corresponding to the speech, and the second effect score is used to evaluate the accuracy of the stop token predicted with the speech synthesis model.

13. The system of claim 12, wherein obtaining the evaluation index further includes:
designating the sentence corresponding to the speech that has a duration greater than or equal to a first target threshold as an abnormal sentence.

14. The system of claim 12, wherein obtaining the evaluation index further includes:
obtaining a recognized result based on the speech and determining a correct ending position of the sentence corresponding to the speech based on the recognized result;
determining a correct ending position of an abnormal sentence based on the recognized result; and
designating the sentence corresponding to the speech that does not end at the correct ending position as the abnormal sentence.

15. The system of claim 14, wherein the recognized result includes valid phoneme and invalid phoneme, and the determining the correct ending position of the sentence corresponding to the speech based on the recognized result includes:
comparing the recognized result with the text corresponding to the speech; and
determining the correct ending position of the sentence corresponding to the speech based on the comparison result.

16. The system of claim 11, wherein the second effect score is represented by a count of abnormal sentence, and the preset condition includes the count of the abnormal sentence is greater than or equal to a second target threshold.

17. The system of claim 11, wherein:
the speech synthesis model includes an embedding layer, a speech synthesis layer, and a position layer.

18. The system of claim 17, wherein the training the speech synthesis model when the evaluation index meets the preset condition includes:
training the speech synthesis model based on an abnormal training database, wherein the abnormal training database is configured to store an abnormal sentence and the correct ending position of the abnormal sentence.

19. The system of claim 18, wherein the training includes:
generating an embedding feature based on the abnormal sentence in the abnormal training database by the embedding layer; and
training the position layer based on the embedding feature, wherein the position layer takes the embedding feature as a training sample and the correct ending position of the abnormal sentence as a label, and the position layer is configured to update the speech synthesis model.

20. A non-transitory computer-readable storage medium, comprising instructions that, when executed by at least one processor, direct the at least processor to perform a method for synthesizing a speech, the method comprising:
generating the speech based on a text with a speech synthesis model, wherein the speech synthesis model is configured to output the speech corresponding to the text and a stop token indicating where the speech should stop;
obtaining an evaluation index, wherein the evaluation index includes a second effect score of the speech synthesis model, and the second effect score is generated based on at least one of a duration of the speech and a correct ending position of a sentence corresponding to the speech; and
training the speech synthesis model when the evaluation index meets a preset condition.

* * * * *